(12) United States Patent
Elbracht et al.

(10) Patent No.: US 10,450,048 B2
(45) Date of Patent: Oct. 22, 2019

(54) AIRCRAFT FUSELAGE STRUCTURE

(71) Applicant: Airbus Operations GmbH, Hamburg (DE)

(72) Inventors: Dirk Elbracht, Hamburg (DE); Cord Haack, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 384 days.

(21) Appl. No.: 15/346,166

(22) Filed: Nov. 8, 2016

(65) Prior Publication Data

US 2017/0129586 A1     May 11, 2017

(30) Foreign Application Priority Data

Nov. 9, 2015   (EP) ..................................... 15193741

(51) Int. Cl.
*B64C 1/14*     (2006.01)
*B33Y 10/00*    (2015.01)
(Continued)

(52) U.S. Cl.
CPC ............ *B64C 1/1461* (2013.01); *B29C 64/00* (2017.08); *B33Y 10/00* (2014.12); *B33Y 80/00* (2014.12);
(Continued)

(58) Field of Classification Search
CPC ........... B64C 1/1461; B64C 1/12; B64C 1/14; B33Y 10/00; B33Y 80/00; B29C 64/00
See application file for complete search history.

(56) References Cited

U.S. PATENT DOCUMENTS 3,004,303 A * 10/1961 Wilmer ................... B64C 1/143
                                              244/129.5
3,791,073 A *  2/1974 Baker .................... B64C 1/1407
                                              244/129.5
(Continued)

FOREIGN PATENT DOCUMENTS

DE   102009056533 A1    6/2011
EP        2374713     * 10/2011
(Continued)

OTHER PUBLICATIONS

Extended European Search Report for Application No. 15193741 dated May 2, 2016.

(Continued)

*Primary Examiner* — Justin M Benedik
(74) *Attorney, Agent, or Firm* — Jenkins, Wilson, Taylor & Hunt, P.A.

(57) ABSTRACT

An aircraft fuselage structure comprising a skin element having an inner surface, a support structure connected to the inner surface for supporting the skin element, and a door opening provided in the skin element, wherein the support structure comprises an upper longitudinal element, a lower longitudinal element, a first circumferential element and a second circumferential element provided at the door opening. The object to provide an aircraft fuselage structure, wherein the support structure around the door opening is optimized for a minimum weight, is achieved in that the support structure comprises a first upper angled element extending from an upper first corner to an upper center point, and a second upper angled element extending from an upper second corner to the upper center point, such that the upper longitudinal element, the first upper angled element, and the second upper angled element together form a central upper triangle.

20 Claims, 4 Drawing Sheets

(51) Int. Cl.
*B33Y 80/00* (2015.01)
*B64C 1/12* (2006.01)
*B29C 64/00* (2017.01)
*B29L 31/30* (2006.01)

(52) U.S. Cl.
CPC .............. *B64C 1/12* (2013.01); *B64C 1/14* (2013.01); *B29L 2031/3082* (2013.01)

(56) References Cited

U.S. PATENT DOCUMENTS

| | | | | |
|---|---|---|---|---|
| 4,187,704 | A * | 2/1980 | Ristic-Petrovic | ....... E05B 51/02 137/637 |
| 4,720,065 | A * | 1/1988 | Hamatani | ............. B64C 1/1407 244/129.5 |
| 2009/0308977 | A1 * | 12/2009 | Larcher | .................. B64C 1/062 244/129.5 |
| 2012/0132755 | A1 * | 5/2012 | Petit | ........................ B64C 3/187 244/131 |

FOREIGN PATENT DOCUMENTS

| EP | 2374713 A2 | 10/2011 |
|---|---|---|
| WO | WO 2011066950 A1 | 6/2011 |

OTHER PUBLICATIONS

Chinese Office Action for Application No. 201610977224.7 dated Jun. 26, 2019.

\* cited by examiner

AIRCRAFT FUSELAGE STRUCTURE

CROSS-REFERENCE TO RELATED APPLICATION

This application claims priority to European Patent Application No. 15193741.4 filed Nov. 9, 2015, the entire disclosure of which is incorporated herein by reference.

TECHNICAL FIELD

The present disclosure relates to an aircraft fuselage structure comprising a skin element, a support structure for supporting the skin element, and a door opening for access to an interior of the aircraft fuselage structure and for receiving a door, in particular a cabin door.

BACKGROUND

The skin element has an inner surface facing the interior of the aircraft fuselage structure, and an outer surface. The support structure is connected to the inner surface of the skin element and may comprise a plurality of support elements, such as frame elements or stringer elements. The door opening is provided in the skin element and has an essentially rectangular shape, wherein the corners might be rounded. The rectangular shape relates to a side view on the aircraft fuselage structure where the door opening is visible. Of course, when viewed in the longitudinal direction of the aircraft fuselage structure, the skin element and the support structure follows a curved outline along the circumference of the aircraft fuselage structure.

The support structure comprises an upper longitudinal element provided at an upper longitudinal edge of the door opening, a lower longitudinal element provided at a lower longitudinal edge of the door opening opposite the upper longitudinal edge, a first circumferential element provided at a first circumferential edge of the door opening at a first side with respect to the door opening, and a second circumferential element provided at a second circumferential edge of the door opening opposite the first circumferential edge, i.e. at a second side with respect to the door opening opposite the first side. The longitudinal and circumferential directions are preferably perpendicular with respect to one another and refer to a longitudinal axis of the aircraft fuselage structure or the associated aircraft. The first side may preferably be directed to the front and the second side may preferably be directed to the rear of the aircraft fuselage structure.

Such aircraft fuselage structures are commonly used in the art, wherein the support structure comprises a plurality of frame elements which extend in the circumferential direction of the aircraft fuselage structure, i.e. in parallel to the first and second circumferential elements at the door opening, and a plurality of stringer elements extending in the longitudinal direction of the aircraft fuselage structure, i.e. in parallel to the upper and lower longitudinal elements at the door opening. Such a support structure, comprising a uniform grid of frame elements and stringer elements, wherein the stringer elements extend in parallel to one another and perpendicularly to the frame elements, has been established for its reliability, for its simple manufacturing and mounting, as well as for its good predictability of load cases and failure.

However, the common arrangement of frame and stringer elements does not reflect the location of the actual load paths along the aircraft fuselage structure. Numerical calculations of a variety of load cases have shown that the main load paths along the aircraft fuselage structure do not extend mainly in the longitudinal and in the circumferential directions, but are rather skewed or angled by a certain angle between these both directions, thereby forming a grit or web along the aircraft fuselage structure forming a plurality of triangles instead of only rectangles as done by the common frame and stringer elements. In order to optimize the aircraft fuselage structure for a minimum weight it would be desirable to rearrange the support structure such that the support elements, i.e. the frame and stringer elements, extend along the main load paths instead of in the longitudinal and circumferential directions only.

Yet, such an arrangement of the support structure along the main load paths has not been practically implemented yet, since manufacture and mounting of such an aircraft fuselage structure would be extremely complex and expensive with the common techniques of assembling the aircraft fuselage structure from a plurality of separate parts, such as skin, stringer, frame, which have to be joined e.g. by riveting or bonding. However, with the recent progress in the ALM technology such aircraft fuselage structures including a main load path oriented support structure appear more realistic, as the complex support structure could be simply printed integrally together with the skin element.

While the load paths in some parts of the aircraft fuselage structure may change depending on the respective aircraft geometry, the present disclosure focuses on the surround structure of the door opening, where the load paths remain substantially the same irrespective of the aircraft model, and a complex superposition of main load paths requires particular consideration.

SUMMARY

Therefore, an object of the present disclosure is to provide an aircraft fuselage structure, wherein the support structure around the door opening is optimized for a minimum weight of the aircraft fuselage structure.

This object is achieved in that the support structure comprises a first upper angled element extending from an upper first corner, where the upper longitudinal element joins the first circumferential element, to an upper center point above the upper longitudinal element. Preferably, the upper center point is located centrally between the first and the second side, having the same distance to the upper first corner as to the upper second corner. The first upper angled element is angled or skewed with respect to the longitudinal and circumferential directions, i.e. extends preferably strait under an angle between 0° and 90° between the longitudinal direction and the circumferential direction. Further, the support structure comprises a second upper angled element extending from an upper second corner, where the upper longitudinal element joins the second circumferential element, to the upper center point where it joins the first upper angled element. The second upper angled element is angled or skewed with respect to the longitudinal and circumferential directions, i.e. extends preferably strait under an angle between 0° and 90° between the longitudinal direction and the circumferential direction. In such a way the upper longitudinal element, the first upper angled element and the second upper angled element together form a central upper triangle between the upper center point, the upper first corner and the upper second corner.

Additionally or alternatively, the support structure comprises a first lower angled element extending from a lower first corner, where the lower longitudinal element joins the first circumferential element, to a lower center point below the lower longitudinal element. Preferably, the lower center point is located centrally between the first side and the second side with the same distance to the lower first corner as to the lower second corner. The first lower angled element is angled or skewed with respect to the longitudinal and circumferential directions, i.e. extends preferably strait under an angle between 0° and 90° between the longitudinal direction and the circumferential direction. Further, the support structure comprises a second lower angled element extending from a lower second corner, where the lower longitudinal element joins the second circumferential element, to the lower center point where it joins the first lower angled element. The second lower angled element is angled or skewed with respect to the longitudinal and circumferential directions, i.e. extends preferably strait under an angle of between 0° and 90° between the longitudinal direction and the circumferential direction. In such a way the lower longitudinal element, the first lower angled element and the second lower angled element together form a central lower triangle between the lower center point, the lower first corner and the lower second corner.

By the central upper triangle and the central lower triangle the support structure is formed along the main load paths above and below the door opening, so that a minimum weight of the support structure is required. The triangular shape of the central upper and lower triangles represents a very stable geometric form.

According to a preferred embodiment, the first upper angled element extends as a strait elongation beyond the upper center point to a second upper edge point located above the upper second corner on the second side. Additionally or alternatively, it is preferred that the second upper angled element extends as a strait elongation beyond the upper center point to a first upper edge point located above the upper first corner on the first side, so that the first upper angled element preferably intersects the second upper angled element in the upper center point. Additionally or alternatively, it is preferred that the first lower angled element extends as a strait elongation beyond the lower center point to a second lower edge point located below the lower second corner on the second side. Additionally or alternatively, it is preferred that the second lower angled element extends as a strait elongation beyond the lower center point to a first lower edge point located below the lower first corner on the first side, so that the first lower angled element preferably intersects the second lower angled element in the lower center point.

In such a way, the first and second upper angled elements as well as the first and second lower angled elements extend along the main load paths of the aircraft fuselage structure thereby requiring a minimum weight of the support structure.

According to another preferred embodiment, the first upper angled element extends as a strait elongation beyond the upper first corner to a first lateral upper edge point on the first side. Additionally or alternatively, it is preferred that the second upper angled element extends as a strait elongation beyond the upper second corner to a second lateral upper edge point on the second side. Additionally or alternatively, it is preferred that the first lower angled element extends as a strait elongation beyond the lower first corner to a first lateral lower edge point on the first side. Additionally or alternatively, it is preferred that the second lower angled element extends as a strait elongation beyond the lower second corner to a second lateral lower edge point on the second side.

In such a way the first and second upper and the first and second lower angled elements extend along the main load paths of the aircraft fuselage structure, thereby requiring a minimum weight of the support structure.

According to yet another preferred embodiment, the support structure comprises a first upper connection element extending from the first upper edge point to a first upper intersection point at the first upper angled element, i.e. where the first upper connection element intersects the first upper angled element. In such a way, the first upper angled element, the second upper angled element and the first upper connection element together form a first upper triangle between the upper center point, the first upper edge point and the first upper intersection point. The first upper triangle is thus formed beside the central upper triangle at the first side with respect to the door opening. Additionally or alternatively, it is preferred that the support structure comprises a second upper connection element extending from the second upper edge point to a second upper intersection point at the second upper angled element, i.e. where the second upper connection element intersects the second upper angled element. In such a way the first upper angled element, the second upper angled element and the second upper connection element together form a second upper triangle between the upper center point, the second upper edge point and the second upper intersection point. The second upper triangle is thus formed beside the central upper triangle at the second side with respect to the door opening. Additionally or alternatively, the support structure comprises a first lower connection element extending from the first lower edge point to a first lower intersection point at the first lower angled element, i.e. where the first lower connection element intersects the first lower angled element. In such a way the first lower angled element, the second lower angled element and the first lower connection element together form a first lower triangle between the lower center point, the first lower edge point and the first lower intersection point. The first lower triangle is thus formed beside the central lower triangle at the first side with respect to the door opening. Additionally or alternatively, it is preferred that the support structure comprises a second lower connection element extending from the second lower edge point to a second lower intersection point at the second lower angled element, i.e. where the second lower connection element intersects the second lower angled element. In such a way, the first lower angled element, the second lower angled element and the second lower connection element together form a second lower triangle between the lower center point, the second lower edge point and the second lower intersection point. The second lower triangle is thus formed beside the central lower triangle at the second side with respect to the door opening.

By the first and second upper and the first and second lower triangles the support structure is formed along the main load paths of the aircraft fuselage structure, and by the triangular shapes very stable geometrical forms are created, such that a minimum weight is required by the support structure.

In particular, it is preferred that the first upper connection element extends perpendicularly with respect to the second upper angled element. Additionally or alternatively, it is preferred that the second upper connection element extends perpendicularly with respect to the first upper angled element. Additionally or alternatively, it is preferred that first lower connection element extends perpendicularly with respect to the second lower angled element. Additionally or alternatively, it is preferred that the second lower connection element extends perpendicularly with respect to the first lower angled element.

In such a way, the first and second upper and lower triangles are formed as right angled triangles, and the support structure is formed along the main load paths of the aircraft fuselage structure, thereby enabling a minimum necessary weight of the support structure.

According to a further preferred embodiment, the first upper connection element extends as a strait elongation beyond the first upper intersection point, thereby intersecting the first upper angled element, to a first lateral intersection point, where the first upper connection element intersects the first lower connection element, and as a strait elongation beyond the first lateral intersection point to the first lateral lower edge point, where the first upper connection element joins the first lower angled element. Preferably, the first lower connection element extends as a strait elongation beyond the first lower intersection point, thereby intersecting the first lower angled element, to the first lateral intersection point and as a strait elongation beyond the first lateral intersection point to the first lateral upper edge point, where the first lower connection element joins the first upper angled element. In such a way, the first upper connection element, the first lower connection element and the first upper angled element together form a first upper lateral triangle between the first upper intersection point, the first lateral upper edge point and the first lateral intersection point. Further, the first upper connection element, the first lower connection element and the first lower angled element together form a first lower lateral triangle between the first lower intersection point, the first lateral lower edge point and the first lateral intersection point.

Additionally or alternatively, the second upper connection element extends as a strait elongation beyond the second upper intersection point, thereby intersecting the second upper angled element, to a second lateral intersection point, where the second upper connection element intersects the second lower connection element, and as a strait elongation beyond the second lateral intersection point to the second lateral lower edge point, where the second upper connection element joins the second lower angled element. Preferably, the second lower connection element extends as a strait elongation beyond the second lower intersection point, thereby intersecting the second lower angled element, to the second lateral intersection point and as a strait elongation beyond the second lateral intersection point to the second lateral upper edge point where the second lower connection element joins the second upper angled element. In such a way, the second upper connection element, the second lower connection element and the second upper angled element together form a second upper lateral triangle between the second upper intersection point, the second lateral upper edge point and the second lateral intersection point. Further, the second upper connection element, the second lower connection element and the second lower angled element together form a second lower lateral triangle between the second lower intersection point, the second lateral lower edge point and the second lateral intersection point.

By the first and second upper and lower lateral triangles the support structure is formed along the main load paths of the aircraft fuselage structure and a very stable geometrical form is created, so the weight required by the support structure can be reduced.

In particular, it is preferred that the first upper connection element extends perpendicularly with respect to the first lower angled element. Additionally or alternatively, the second upper connection element extends perpendicularly with respect to the second lower angled element. Additionally or alternatively, the first lower connection element extends perpendicularly with respect to the first upper angled element. Additionally or alternatively, the second lower connection element extends perpendicularly with respect to the second upper angled element.

In such a way, the first and second upper and lower lateral triangles are formed as right angled triangles extending along the main load paths of the aircraft fuselage structure, thereby requiring a minimum weight of the support structure.

According to yet a further preferred embodiment, the first upper angled element, the second upper connection element, the second lower angled element and the first lower connection element together form a first rectangle between the first lateral upper edge point, the second upper edge point, the second lateral lower edge point and the first lower edge point. Additionally or alternatively, the second upper angled element, the second lower connection element, the first lower angled element and the first upper connection element together form a second rectangle between the first upper edge point, the second lateral upper edge point, the second lower edge point and the first lateral lower edge point.

By the first and second rectangle a very stable closed support structure is formed which extends along the main load paths of the aircraft fuselage structure in order to reduce the required weight of the support structure.

In particular, it is preferred that the first rectangle and the second rectangle have the same side lengths. It is further preferred that the first rectangle is skewed with respect to the second rectangle about a central axis perpendicular to the inner surface of the skin element. Preferably, the first rectangle is skewed with respect to the second rectangle by an angle of between 0° and 45°.

In such a way, by the first and second rectangle having same side lengths and being skewed to one another by an angle of between 0° and 45°, a plurality of similar triangles is formed between the intersections of the first and second rectangles, which represent very stable geometric forms extending along the main load paths of the aircraft fuselage structure.

According to another preferred embodiment, the support structure is formed integrally with the skin element, i.e. formed together as one integral part without any rivets, bolts, welds, adhesive connections, or other connections in between two or more separate parts. The support structure can be formed integrally with the skin element by an additive layer manufacturing (ALM) method, such as a 3D-printing method, in a considerably simple way. This simplifies manufacturing and mounting of the aircraft fuselage structure and creates a more resistant and lightweight aircraft fuselage structure.

According to yet another preferred embodiment, a plurality of doorstop devices are provided which project from a door-facing surface of the first circumferential element and/or of the second circumferential element to the door opening. The first circumferential element and/or the second circumferential element comprise a plurality of bores. The doorstop devices are mounted to the support structure and/or to the skin element on the side of the first and/or second circumferential element opposite from the door-facing surface. The doorstop devices project through the bores into the door opening.

In such a way, the doorstop devices, which used to be formed in two parts, one part projecting from the door-facing surface into the door opening and another part supporting the first part of the doorstop device at the side of the circumferential element opposite from the door-facing surface, can be formed in one piece projecting from the side of the respective first or second circumferential element opposite from the door-facing surface through the bore into the door opening, preferably by an ALM-method.

In particular, it is preferred that a door is arranged in the door opening, which comprises a plurality of doorstop counter pieces configured to engage the doorstop devices in order to lock the door in the door opening. The doorstop counter pieces are preferably formed movably, such that they can be moved between a locked position, where they engage the doorstop devices and lock the door, and an unlocked position, where they do not engage the doorstop devices and unlock the door.

By the moveably doorstop counter pieces the door can be locked and unlocked without the door needing to be lifted in order to be unlocked, which is the case for the doors known in the art in order to be reliably locked. With the ALM-technique the moveably doorstop counter pieces can be formed with the required high tolerances, so that for a reliable locking of the door moveable doorstop counter pieces can be employed and it is not important anymore that the doorstop counter pieces are formed rigidly and fixed to the door, so that the door can only be unlocked by being lifted. Without needing to lift the door in order to unlock it the required sealing on the upper and lower longitudinal edges of the door opening can be saved.

In particular, it is preferred that the door comprises an actuator configured for moving the doorstop counter pieces between the locked position and the unlocked position in order to lock or unlock the door. The actuator can be e.g. a mechanism which can be operated by hand or by a motor.

The afore-described one-piece doorstop devices according to the disclosure herein may also be included in aircraft fuselage structures with a support structure as known in the art having longitudinal and circumferential support elements, in particular stringer and frame elements, and preferably no angled or skewed support elements around the door opening.

Such aircraft fuselage structures comprise a skin element, a support structure for supporting the skin element, and a door opening for access to an interior of the aircraft fuselage structure and for receiving a door, in particular a cabin door. The skin element has an inner surface facing the interior of the aircraft fuselage structure, and an outer surface. The support structure is connected to the inner surface of the skin element and may comprise a plurality of support elements, such as frame elements and stringer elements. The frame elements extend in a circumferential direction and the stringer elements extend in a longitudinal direction of the aircraft fuselage structure or of the associated aircraft. In such a way, the support structure preferably comprises a uniform grid of frame elements and stringer elements, wherein the stringer elements extend in parallel to one another and perpendicularly to the frame elements. The door opening is provided in the skin element and has an essentially rectangular shape, wherein the corners might be rounded. The rectangular shape relates to a side view on the aircraft fuselage structure where the door opening is visible. Of course, when viewed in the longitudinal direction of the aircraft fuselage structure, the skin element and the support structure follows a curved outline along the circumference of the aircraft fuselage structure.

The support structure comprises an upper longitudinal element provided at an upper longitudinal edge of the door opening, a lower longitudinal element provided at a lower longitudinal edge of the door opening opposite the upper longitudinal edge, a first circumferential element provided at a first circumferential edge of the door opening at a first side with respect to the door opening, and a second circumferential element provided at a second circumferential edge of the door opening opposite the first circumferential edge, i.e. at a second side with respect to the door opening opposite the first side. The longitudinal and circumferential directions are preferably perpendicular with respect to one another and refer to a longitudinal axis of the aircraft fuselage structure or the associated aircraft. The first side may preferably be directed to the front and the second side may preferably be directed to the rear of the aircraft fuselage structure.

A plurality of doorstop devices are provided which project from a door-facing surface of the first circumferential element and/or of the second circumferential element to the door opening. The first circumferential element and/or the second circumferential element comprise a plurality of bores. The doorstop devices are mounted to the support structure and/or to the skin element on the side of the first and/or second circumferential element opposite from the door-facing surface. The doorstop devices project through the bores into the door opening.

In such a way, the doorstop devices, which used to be formed in two parts in the prior art, one part projecting from the door-facing surface into the door opening and another part supporting the first part of the doorstop device at the side of the circumferential element opposite from the door-facing surface, can be formed in one piece projecting from the side of the respective first or second circumferential element opposite from the door-facing surface through the bore into the door opening, preferably by an ALM-method.

In particular, it is preferred that a door is arranged in the door opening, which comprises a plurality of doorstop counter pieces configured to engage the doorstop devices in order to lock the door in the door opening. The doorstop counter pieces are preferably formed movably, such that they can be moved between a locked position, where they engage the doorstop devices and lock the door, and an unlocked position, where they do not engage the doorstop devices and unlock the door.

By the moveably doorstop counter pieces the door can be locked and unlocked without the door needing to be lifted in order to be unlocked, which is the case for the doors known in the art in order to be reliably locked. With the ALM-technique the moveably doorstop counter pieces can be formed with the required high tolerances, so that for a reliable locking of the door moveable doorstop counter pieces can be employed and it is not important anymore that the doorstop counter pieces are formed rigidly and fixed to the door, so that the door can only be unlocked by being lifted. Without needing to lift the door in order to unlock it the required sealing on the upper and lower longitudinal edges of the door opening can be saved.

In particular, it is preferred that the door comprises an actuator configured for moving the doorstop counter pieces between the locked position and the unlocked position in order to lock or unlock the door. The actuator can be e.g. a mechanism which can be operated by hand or by a motor.

A further aspect of the present disclosure relates to a method for manufacturing an aircraft fuselage structure according to any of the embodiments described above, wherein an ALM-method is carried out. Preferably, a high deposition ALM-method is carried out. By the ALM-method the complicated triangular and rectangular forms of the support structure can be easily manufactured. Further, the support structure can be manufactured integrally with the skin element. However, instead of manufacturing the entire aircraft fuselage structure integrally, it is also possible to manufacture separate sections and, subsequently, assemble these sections.

BRIEF DESCRIPTION OF THE DRAWINGS

In the following preferred embodiments of the present disclosure are described in more detail by a drawing. The drawing shows in.

DETAILED DESCRIPTION

Figure 1:
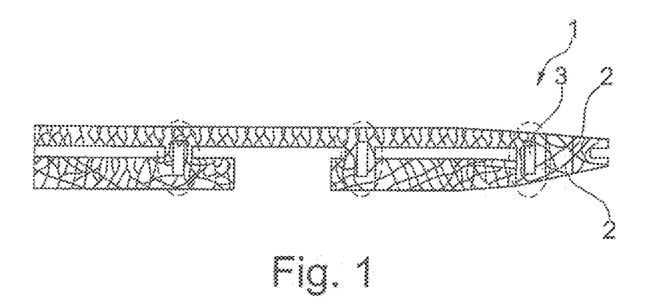
FIG. 1 a side view of an aircraft fuselage structure according to the disclosure herein, wherein the main load paths are indicated.
Figure 2:
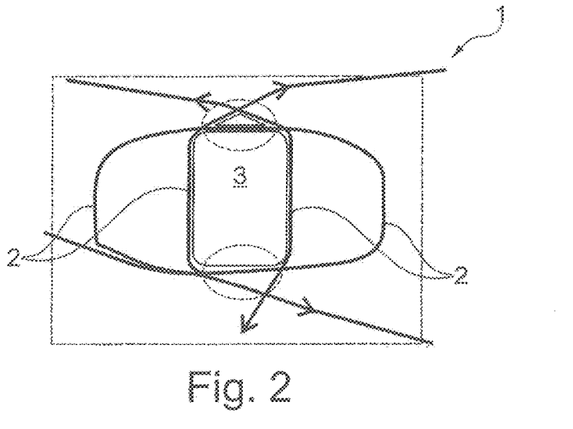
FIG. 2 a detailed view of the area around a door opening of the aircraft fuselage structure shown in FIG. 1.

FIG. 1 shows an embodiment of an aircraft fuselage structure 1 according to the disclosure herein, wherein the main load paths 2 are indicated on the surface of the aircraft fuselage structure 1. FIG. 2 shows a detailed view of the area around a door opening 3 of the embodiment of FIG. 1, wherein the resultant main load paths around the door opening 3 are visible.

Figure 3:
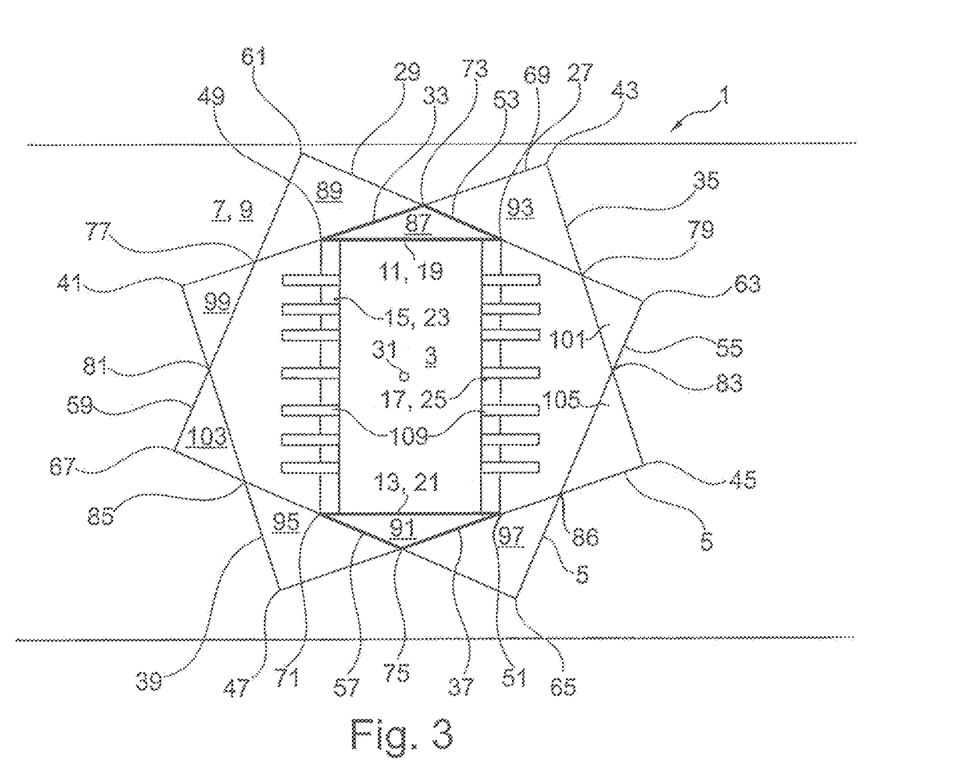
FIG. 3 a schematic view of the support structure around the door opening of the aircraft fuselage structure shown in FIG. 1, adapted to the main load paths shown in FIG. 2.

FIG. 3 shows the aircraft fuselage structure 1 as shown in FIG. 2, wherein the support structure 5 has been arranged in correspondence to the main load paths so as to optimize the support structure 5 for a minimum weight. The aircraft structure component comprises a skin element 7, a support structure 5 and a door opening 3. The skin element 7 has an inner surface 9 and the support structure 5 is connected to the inner surface 9 in order to support the skin element 7. The door opening 3 is provided in the skin element 7 and has a rectangular shape including an upper longitudinal edge 11, a lower longitudinal edge 13 opposite the upper longitudinal edge 11, a first circumferential edge 15 at a first side and a second circumferential edge 17 at a second side opposite the first side. The support structure 5 comprises an upper longitudinal element 19 provided at the upper longitudinal edge 11, a lower longitudinal element 21 provided at the lower longitudinal edge 13, a first circumferential element 23 provided at the first circumferential edge 15 and a second circumferential element 25 provided at the second circumferential edge 17.

The support structure 5 further comprises a plurality of support elements which are arranged in the shape of a first rectangle 27 and a second rectangle 29. The first and second rectangles 27, 29 have the same side lengths and are skewed with respect to one another by an angle of between 0° and 45° about a central axis 31 perpendicular to the inner surface 9 of the skin element 7, such that they overlap and intersect each other in a plurality of points.

The first rectangle 27 is formed by a first upper angled element 33, a second upper connection element 35, a second lower angled element 37 and a first lower connection element 39 between a first lateral upper edge point 41, a second upper edge point 43, a second lateral lower edge point 45 and a first lower edge point 47. The first upper angled element 33 of the first rectangle 27 intersects an upper first corner 51 where the upper longitudinal element 19 joins the first circumferential element 23. The second lower angled element 37 of the first rectangle 27 intersects a lower second corner 53 where the lower longitudinal element 21 joins the second circumferential element 25. Further with respect to the first rectangle 27, the first upper angled element 33 extends in parallel to the second lower angled element 37, and the second upper connection element 35 extends in parallel to the first lower connection element 39. At the same time the first upper angled element 33 and the second lower angled element 37 extend perpendicularly with respect to the second upper connection element 35 and the first lower connection element 39.

The second rectangle 29 is formed by a second upper angled element 53, a second lower connection element 55, a first lower angled element 57 and a first upper connection element 59 between a first upper edge point 61, a second lateral upper edge point 63, a second lower edge point 65 and a first lateral lower edge point 67. The second upper angled element 53 of the second rectangle 29 intersects an upper second corner 69 where the upper longitudinal element 19 joins the second circumferential element 25. The first lower angled element 57 of the second rectangle 29 intersects a lower first corner 71 where the lower longitudinal element 21 joins the first circumferential element 23. Further with respect to the second rectangle 29, the second upper angled element 53 extends in parallel to the first lower angled element 57, and the first upper connection element 59 extends in parallel to the second lower connection element 55. At the same time, the second upper angled element 53 and the first lower angled element 57 extend perpendicularly with respect to the first upper connection element 59 and the second lower connection element 55.

The first rectangle 27 and the second rectangle 29 intersect one another in an upper center point 73 above the upper longitudinal element 19, in a lower center point 75 below the lower longitudinal element 21, in a first upper intersection point 77 on the first side, in a second upper intersection point 79 on the second side, in a first lateral intersection point 81 on the first side, in a second lateral intersection point 83 on the second side, in a first lower intersection point 85 on the first side, and in a second lower intersection point 86 on the second side with respect to the door opening 3.

In such a way, a central upper triangle 87 is formed by the upper longitudinal element 19, the first upper angled element 33 and the second upper angled element 53 between the upper center point 73, the upper first corner 49 and the upper second corner 69. A central lower triangle 91 is formed by the lower longitudinal element 21, the first lower angled element 57 and the second lower angled element 37 between the lower center point 75, the lower first corner 71 and the lower second corner 51.

Beside the central upper triangle 87 on the first side a first upper triangle 89 is formed by the first upper angled element 33, the second upper angled element 53 and the first upper connection element 59 between the upper center point 73, the first upper edge point 61 and the first upper intersection point 77. Beside the central upper triangle 87 on the second side a second upper triangle 93 is formed by the first upper angled element 33, the second upper angled element 53 and the second upper connection element 35 between the upper center point 73, the second upper edge point 43 and the second upper intersection point 79.

Beside the central lower triangle 91 on the first side a first lower triangle 95 is formed by the first lower angled element 57, the second lower angled element 37 and the first lower connection element 39 between the lower center point 75, the first lower edge point 47 and the first lower intersection point 85. Beside the central lower triangle 91 on the second side a second lower triangle 97 is formed by the first lower angled element 57, the second lower angled element 37 and the second lower connection element 55 between the lower center point 75, the second lower edge point 65 and the second lower intersection point 86.

Beside the first upper triangle 89 on the first side a first upper lateral triangle 99 is formed by the first upper connection element 59, the first lower connection element 39 and the first upper angled element 33 between the first upper intersection point 77, the first lateral upper edge point 41 and the first lateral intersection point 81. Beside the second upper triangle 93 on the second side a second upper lateral triangle 101 is formed by the second upper connection element 35, the second lower connection element 55 and the second upper angled element 53 between the second upper intersection point 79, the second lateral upper edge point 63 and the second lateral intersection point 83.

Beside the first lower triangle 95 on the first side a first lower lateral triangle 103 is formed by the first upper connection element 59, the first lower connection element 39 and the first lower angled element 57 between the first lower intersection point 85, the first lateral lower edge point 67 and the first lateral intersection point 81. Beside the second lower triangle 97 on the second side a second lower lateral triangle 105 is formed by the second upper connection element 35, the second lower connection element 55 and the second lower angled element 37 between the second lower intersection point 86, the second lateral lower edge point 45 and the second lateral intersection point 83.

The support structure 5 is formed integrally with the skin element 7 as one piece. Such integral aircraft fuselage structures 1 can be produced by an ALM-method, in particular a high deposition ALM-method. The aircraft fuselage structure 1 might be produced as one but may also be produced section-wise, wherein a plurality of aircraft fuselage structure sections 1, such as the section around the door opening 3 can be produced separately and assembled afterwards.

Figure 4:
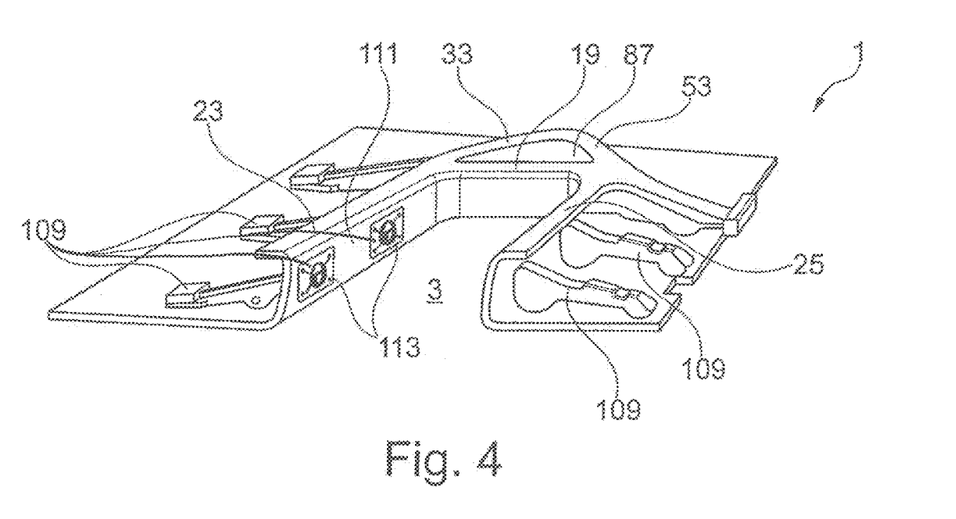
FIG. 4 a perspective view of the support structure around the door opening as shown in FIG. 3, wherein doorstop devices are illustrated in more detail.

As shown in FIGS. 3 and 4, the aircraft fuselage structure 1 further comprises a plurality of doorstop devices 109 which project from a door-facing surface 111 of the first circumferential element 23 and of the second circumferential element 25 to the door opening 3. As can be taken from FIG. 4, the first circumferential element 23 and the second circumferential element 25 comprise a plurality of bores 113. The doorstop devices 109 are mounted to the support structure 5 and to the skin element 7 on the side of the first and second circumferential element 25 opposite from the door-facing surface 111. The doorstop devices 109 project through the bores 113 into the door opening 3 in order to provide a bearing surface for locking a door 115 arranged in the door opening 3.

Figure 5:
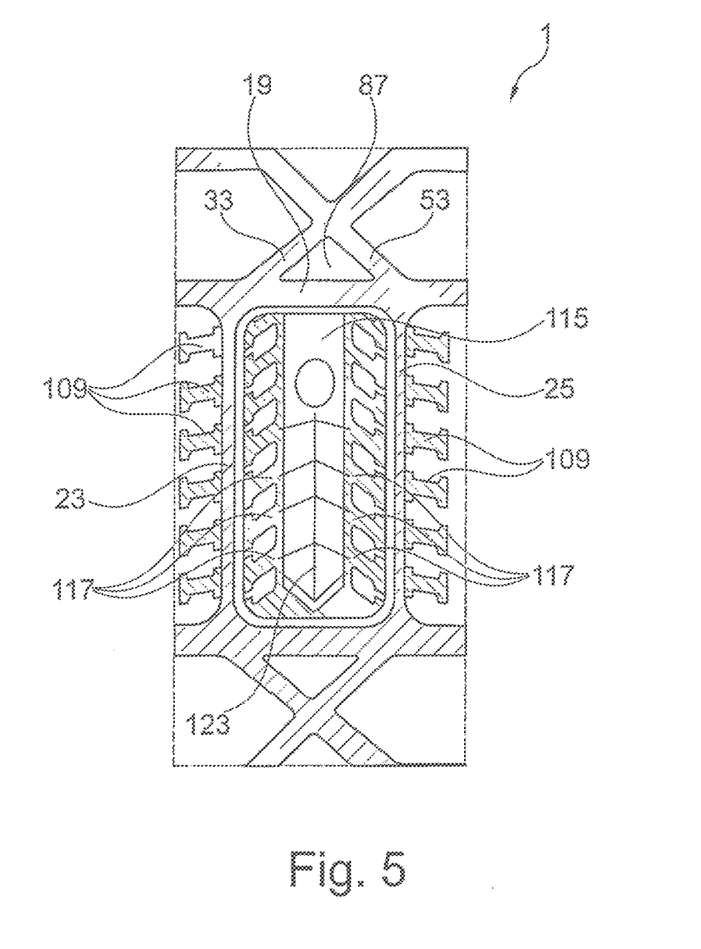
FIG. 5 a front view of the support structure around the door opening of the aircraft fuselage structure as shown in FIG. 4, wherein a door is received in the door opening comprising moveable doorstop counter pieces.

As shown in FIG. 5, a door 115 is arranged in the door opening 3. The door 115 comprises a plurality of doorstop counter pieces 117 configured to engage the doorstop devices in order to lock the door 115 in the door opening 3. The doorstop counter pieces 117 are formed moveably, such that they can be moved between a locked position, where they engage the doorstop devices 109 and lock the door 115, and an unlocked position, where they do not engage the doorstop devices 109 and unlock the door 115. The door 115 further comprises an actuator 123 configured for moving the doorstop counter pieces 117 between the locked position and the unlocked position in order to lock or unlock the door 115.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage structure comprising:
   a skin element having an inner surface;
   a support structure connected to the inner surface of the skin element for supporting the skin element; and
   a door opening provided in the skin element;
   wherein the support structure comprises an upper longitudinal element provided at an upper longitudinal edge of the door opening;
   wherein the support structure comprises a lower longitudinal element provided at a lower longitudinal edge of the door opening, opposite the upper longitudinal edge;
   wherein the support structure comprises a first circumferential element provided at a first circumferential edge of the door opening; and
   wherein the support structure comprises a second circumferential element provided at a second circumferential edge of the door opening, opposite the first circumferential edge;
   wherein:
      the support structure comprises a first upper angled element extending from an upper first corner, which is where the upper longitudinal element joins the first circumferential element, to an upper center point above the upper longitudinal element;
      the support structure comprises a second upper angled element extending from an upper second corner, which is where the upper longitudinal element joins the second circumferential element, to the upper center point where the second upper angled element joins the first upper angled element, and
      the upper longitudinal element, the first upper angled element, and the second upper angled element together form a central upper triangle between the upper center point, the upper first corner, and the upper second corner,
   and/or
   wherein:
      the support structure comprises a first lower angled element extending from a lower first corner, which is where the lower longitudinal element joins the first circumferential element, to a lower center point below the lower longitudinal element,
      the support structure comprises a second lower angled element extending from a lower second corner, which is where the lower longitudinal element joins the second circumferential element, to the lower center point where the second lower angled element joins the first lower angled element, and the lower longitudinal element, the first lower angled element, and the second lower angled element together form a central lower triangle between the lower center point, the lower first corner, and the lower second corner, and wherein:

the first upper angled element extends beyond the upper center point to a second upper edge point located above the upper second corner, the second upper angled element extends beyond the upper center point to a first upper edge point located above the upper first corner, the first lower angled element extends beyond the lower center point to a second lower edge point located below the lower second corner, and/or the second lower angled element extends beyond the lower center point to a first lower edge point located below the lower first corner.

2. The aircraft fuselage structure according to claim 1, wherein:

the first upper angled element extends beyond the upper first corner to a first lateral upper edge point, the second upper angled element extends beyond the upper second corner to a second lateral upper edge point, the first lower angled element extends beyond the lower first corner to a first lateral lower edge point, and/or the second lower angled element extends beyond the lower second corner to a second lateral lower edge point.

3. The aircraft fuselage structure according to claim 2, wherein the support structure comprises:

a first upper connection element extending from the first upper edge point to a first upper intersection point at the first upper angled element, such that the first upper angled element, the second upper angled element, and the first upper connection element together form a first upper triangle between the upper center point, the first upper edge point, and the first upper intersection point, a second upper connection element extending from the second upper edge point to a second upper intersection point at the second upper angled element, such that the first upper angled element, the second upper angled element, and the second upper connection element together form a second upper triangle between the upper center point, the second upper edge point, and the second upper intersection point, a first lower connection element extending from the first lower edge point to a first lower intersection point at the first lower angled element, such that the first lower angled element, the second lower angled element, and the first lower connection element together form a first lower triangle between the lower center point, the first lower edge point, and the first lower intersection point, and/or a second lower connection element extending from the second lower edge point to a second lower intersection point at the second lower angled element, such that the first lower angled element, the second lower angled element, and the second lower connection element together form a second lower triangle between the lower center point, the second lower edge point, and the second lower intersection point.

4. The aircraft fuselage structure according to claim 3, wherein:

the first upper connection element is perpendicular to the second upper angled element, the second upper connection element is perpendicular to the first upper angled element, the first lower connection element is perpendicular to the second lower angled element, and/or the second lower connection element is perpendicular to the first lower angled element.

5. The aircraft fuselage structure according to claim 3, wherein:

the first upper connection element extends beyond the first upper intersection point to a first lateral intersection point, which is where the first upper connection element intersects the first lower connection element, and beyond the first lateral intersection point to the first lateral lower edge point, which is where the first upper connection element joins the first lower angled element, the first lower connection element extends beyond the first lower intersection point to the first lateral intersection point and beyond the first lateral intersection point to the first lateral upper edge point, which is where the first lower connection element joins the first upper angled element, the first upper connection element, the first lower connection element, and the first upper angled element together form a first upper lateral triangle between the first upper intersection point, the first lateral upper edge point, and the first lateral intersection point, and the first upper connection element, the first lower connection element, and the first lower angled element together form a first lower lateral triangle between the first lower intersection point, the first lateral lower edge point, and the first lateral intersection point, and/or wherein:

the second upper connection element extends beyond the second upper intersection point to a second lateral intersection point, which is where the second upper connection element intersects the second lower connection element, and beyond the second lateral intersection point to the second lateral lower edge point, which is where the second upper connection element joins the second lower angled element, the second lower connection element extends beyond the second lower intersection point to the second lateral intersection point and beyond the second lateral intersection point to the second lateral upper edge point, which is where the second lower connection element joins the second upper angled element, the second upper connection element, the second lower connection element, and the second upper angled element together form a second upper lateral triangle between the second upper intersection point, the second lateral upper edge point, and the second lateral intersection point, and the second upper connection element, the second lower connection element, and the second lower angled element together form a second lower lateral triangle between the second lower intersection point, the second lateral lower edge point, and the second lateral intersection point.

6. The aircraft fuselage structure according to claim 5, wherein:

the first upper connection element is perpendicular to the first lower angled element, the second upper connection element is perpendicular to the second lower angled element, the first lower connection element is perpendicular to the first upper angled element, and/or the second lower connection element is perpendicular to the second upper angled element.

7. The aircraft fuselage structure according to claim 5, wherein:

the first upper angled element, the second upper connection element, the second lower angled element, and the first lower connection element together form a first rectangle between the first lateral upper edge point, the second upper edge point, the second lateral lower edge point, and the first lower edge point, and/or wherein the second upper angled element, the second lower connection element, the first lower angled element, and the first upper connection element together form a second rectangle between the first upper edge point, the second lateral upper edge point, the second lower edge point, and the first lateral lower edge point.

8. The aircraft fuselage structure according to claim 7, wherein side lengths of the first rectangle and the second rectangle are a same side length.

9. The aircraft fuselage structure according to claim 7, wherein the first rectangle is skewed with respect to the second rectangle about a central axis, which is perpendicular to the inner surface of the skin element, by an angle of between 0° and 45°.

10. The aircraft fuselage structure according to claim 1, comprising a plurality of doorstop devices which project from a door-facing surface of the first circumferential element or of the second circumferential element out from the door opening, wherein the first circumferential element and/or the second circumferential element comprise a plurality of bores, wherein the doorstop devices are mounted to the support structure or to the skin element on a side of the first circumferential element or the second circumferential element opposite the door-facing surface of the first circumferential element or of the second circumferential element, and wherein the doorstop devices project through the bores into the door opening.

11. The aircraft fuselage structure according to claim 10, wherein:

a door is arranged in the door opening, the door comprises a plurality of doorstop counter pieces configured to engage a respective one of the doorstop devices to lock the door in the door opening, and the doorstop counter pieces are movable between a locked position, where the doorstop counter pieces engage the doorstop devices and lock the door in the door opening, and an unlocked position, where the doorstop counter pieces do not engage the doorstop devices and unlock the door from the door opening.

12. The aircraft fuselage structure according to claim 11, wherein the door comprises an actuator configured for moving the doorstop counter pieces between the locked position and the unlocked position.

13. A method for manufacturing an aircraft fuselage structure according to claim 1, wherein an ALM-method is carried out.

14. The aircraft fuselage structure according to claim 1, wherein the support structure is formed integrally with the skin element.

15. An aircraft fuselage structure, comprising:

a skin element having an inner surface;

a support structure formed integrally with the skin element as one piece; and a door opening provided in the skin element;

wherein the support structure comprises an upper longitudinal element provided at an upper longitudinal edge of the door opening;

wherein the support structure comprises a lower longitudinal element provided at a lower longitudinal edge of the door opening, opposite the upper longitudinal edge;

wherein the support structure comprises a first circumferential element provided at a first circumferential edge of the door opening; and wherein the support structure comprises a second circumferential element provided at a second circumferential edge of the door opening, opposite the first circumferential edge;

wherein:

the support structure comprises a first upper angled element extending from an upper first corner, which is where the upper longitudinal element joins the first circumferential element, to an upper center point above the upper longitudinal element;

the support structure comprises a second upper angled element extending from an upper second corner, which is where the upper longitudinal element joins the second circumferential element, to the upper center point where the second upper angled element joins the first upper angled element, and the upper longitudinal element, the first upper angled element, and the second upper angled element together form a central upper triangle between the upper center point, the upper first corner, and the upper second corner, and/or wherein:

the support structure comprises a first lower angled element extending from a lower first corner, which is where the lower longitudinal element joins the first circumferential element, to a lower center point below the lower longitudinal element, the support structure comprises a second lower angled element extending from a lower second corner, which is where the lower longitudinal element joins the second circumferential element, to the lower center point where the second lower angled element joins the first lower angled element, and the lower longitudinal element, the first lower angled element, and the second lower angled element together form a central lower triangle between the lower center point, the lower first corner, and the lower second corner.

16. The aircraft fuselage structure according to claim 15, wherein:

the first upper angled element extends beyond the upper center point to a second upper edge point located above the upper second corner, the second upper angled element extends beyond the upper center point to a first upper edge point located above the upper first corner, the first lower angled element extends beyond the lower center point to a second lower edge point located below the lower second corner, and/or the second lower angled element extends beyond the lower center point to a first lower edge point located below the lower first corner.

17. The aircraft fuselage structure according to claim 16, wherein:
the first upper angled element extends beyond the upper first corner to a first lateral upper edge point,
the second upper angled element extends beyond the upper second corner to a second lateral upper edge point,
the first lower angled element extends beyond the lower first corner to a first lateral lower edge point, and/or
the second lower angled element extends beyond the lower second corner to a second lateral lower edge point.

18. The aircraft fuselage structure according to claim 17, wherein the support structure comprises:
a first upper connection element extending from the first upper edge point to a first upper intersection point at the first upper angled element, such that the first upper angled element, the second upper angled element, and the first upper connection element together form a first upper triangle between the upper center point, the first upper edge point, and the first upper intersection point,
a second upper connection element extending from the second upper edge point to a second upper intersection point at the second upper angled element, such that the first upper angled element, the second upper angled element, and the second upper connection element together form a second upper triangle between the upper center point, the second upper edge point, and the second upper intersection point,
a first lower connection element extending from the first lower edge point to a first lower intersection point at the first lower angled element, such that the first lower angled element, the second lower angled element, and the first lower connection element together form a first lower triangle between the lower center point, the first lower edge point, and the first lower intersection point, and/or
a second lower connection element extending from the second lower edge point to a second lower intersection point at the second lower angled element, such that the first lower angled element, the second lower angled element, and the second lower connection element together form a second lower triangle between the lower center point, the second lower edge point, and the second lower intersection point.

19. The aircraft fuselage structure according to claim 18, wherein:
the first upper connection element is perpendicular to the second upper angled element,
the second upper connection element is perpendicular to the first upper angled element,
the first lower connection element is perpendicular to the second lower angled element, and/or
the second lower connection element is perpendicular to the first lower angled element.

20. The aircraft fuselage structure according to claim 18, wherein:
the first upper connection element extends beyond the first upper intersection point to a first lateral intersection point, which is where the first upper connection element intersects the first lower connection element, and beyond the first lateral intersection point to the first lateral lower edge point, which is where the first upper connection element joins the first lower angled element,
the first lower connection element extends beyond the first lower intersection point to the first lateral intersection point and beyond the first lateral intersection point to the first lateral upper edge point, which is where the first lower connection element joins the first upper angled element,
the first upper connection element, the first lower connection element, and the first upper angled element together form a first upper lateral triangle between the first upper intersection point, the first lateral upper edge point, and the first lateral intersection point, and
the first upper connection element, the first lower connection element, and the first lower angled element together form a first lower lateral triangle between the first lower intersection point, the first lateral lower edge point, and the first lateral intersection point,
and/or
wherein:
the second upper connection element extends beyond the second upper intersection point to a second lateral intersection point, which is where the second upper connection element intersects the second lower connection element, and beyond the second lateral intersection point to the second lateral lower edge point, which is where the second upper connection element joins the second lower angled element,
the second lower connection element extends beyond the second lower intersection point to the second lateral intersection point and beyond the second lateral intersection point to the second lateral upper edge point, which is where the second lower connection element joins the second upper angled element,
the second upper connection element, the second lower connection element, and the second upper angled element together form a second upper lateral triangle between the second upper intersection point, the second lateral upper edge point, and the second lateral intersection point, and
the second upper connection element, the second lower connection element, and the second lower angled element together form a second lower lateral triangle between the second lower intersection point, the second lateral lower edge point, and the second lateral intersection point.

* * * * *